Aug. 29, 1967

J. GRIGOR ET AL 3,338,253

SPEED AND ANGULAR ACCELERATION RESPONSIVE
CENTRIFUGAL GOVERNORS

Filed Feb. 3, 1964

2 Sheets-Sheet 1

United States Patent Office 3,338,253
Patented Aug. 29, 1967

3,338,253
SPEED AND ANGULAR ACCELERATION RESPONSIVE CENTRIFUGAL GOVERNORS
John Grigor and Ronald Eric Short, Locks Heath, Southampton, England, assignors to Plessey U.K. Limited, a British company
Filed Feb. 3, 1964, Ser. No. 342,314
Claims priority, application Great Britain, Feb. 21, 1963, 6,941/63
3 Claims. (Cl. 137—56)

This invention relates to centrifugal governors of the kind in which the centrifugal force of a fly-weight mass acts against a spring to produce governing movement, generally of a valve. It has for an object to provide an improved governor of the kind specified which, in addition to being speed-responsive, is also responsive to angular acceleration of the governor shaft.

According to the present invention a fly-wheel member is rotatably mounted on or coaxially with the governor shaft and is coupled to the latter by means of a cam rotatable with the fly-wheel member and acting upon the governor spring so that during acceleration of the shaft the inertia of the fly-wheel member acts through the cam element to assist the action of the centrifugal mass in opposition to the spring action.

The invention offers particular advantages in the case of governors in which the valve element which forms part of the centrifugal mass is carried on the circumference of the shaft by the governor spring, which in this case generally is a blade or reed spring. Two embodiments of the invention as applied to such governors will now be described in more detail with reference to the accompanying drawings, in which FIGURE 1 is an elevation, partly in section, of one form of governor according to the invention mounted on one of the shafts of an engine-driven gear-type fuel pump.

Figure 2:
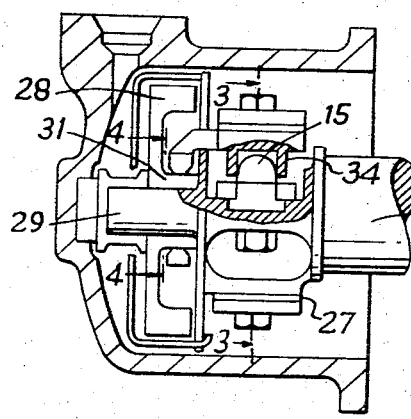
Figure 3:
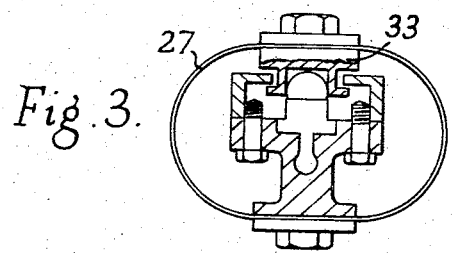
Figure 4:
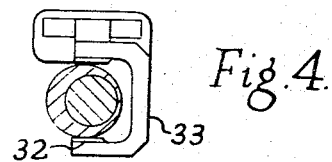

FIGURE 2 is an elevation, partly in axial section, of a modified form of governor according to the invention, FIGURE 3 is a section substantially on line 3—3 of FIGURE 2, and FIGURE 4 is a section on line 4—4 of FIGURE 2.

Figure 1:
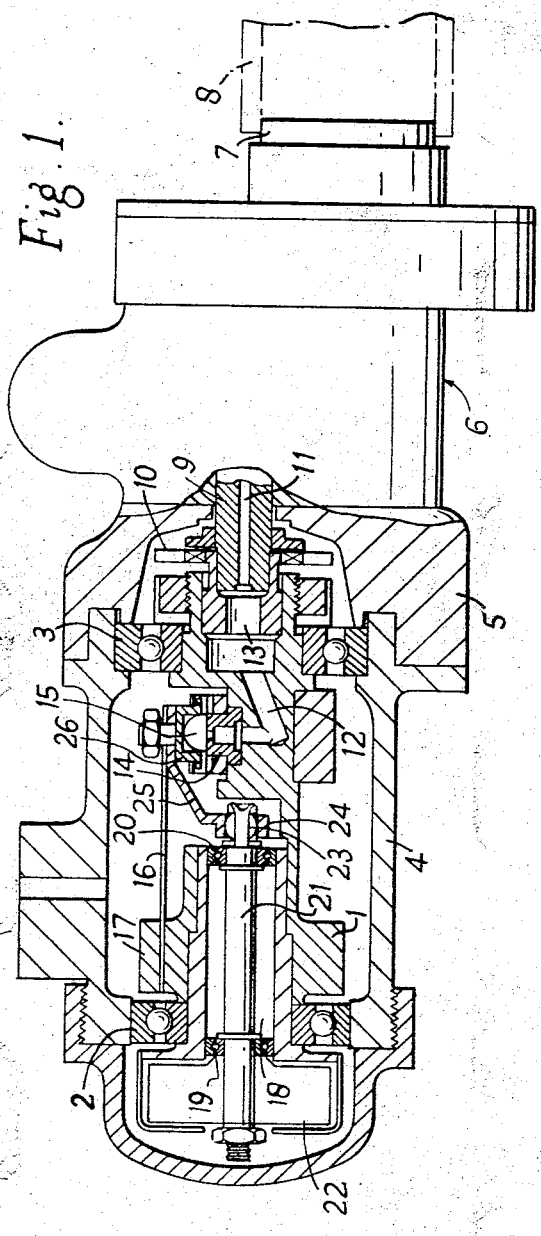

Referring now first to FIGURE 1, a governor shaft 1 is supported by bearings 2 and 3 in a governor housing 4 having an end member 5 which is attached to the housing of a gear pump 6 which is used as a fuel pump of an engine. A shaft 7 of the gear pump 6 is coupled to the engine shaft 8, the governor shaft 1 being aligned with a second shaft 9 of the gear pump. The latter shaft 9 is coupled by a coupling 10 to the governor shaft 1 and has a bore 11 which communicates with the delivery side of the gear pump 6, and the governor shaft 1 has a bore 12, which communicates with the bore 11 through a bore 13 provided in the coupling 10. The bore 12 leads to a valve seat 14 at the circumference of the governor shaft 1, and a half-ball valve 15 is held onto this seat by a governor spring reed 16, which is clamped to the shaft 1 by a block 17. When the governor shaft 1 is rotated, centrifugal force tends to lift the valve 15 off its seat 14 against the resilience of the spring 16. Supported inside the coaxial bore 18 of the governor shaft 1 by ball bearings 19, 20 is an auxiliary shaft 21 which at one end carries a fly-wheel 22, while the other end of the shaft 21 is formed with an eccentric pin 23. This pin is free to rotate between cross guides of a member 24, which may be constituted as shown in FIGURE 4. The member 24 forms part of a bracket 25, and this bracket is clamped to the reed spring 16 together with a cup member 26, which serves as guidance for the half-ball valve member 15.

Assuming the shaft 1 has been rotating at a preset speed, with the half-ball valve 15 partially open under the action of its centrifugal force opposed by the spring 16, so as to spill excess fuel from the pump, and that, due for example to decreased load, the engine speed begins to increase, the fly-wheel 22 and the auxiliary shaft 21 to which the fly-wheel is secured will lag in its rotation behind the shaft 1; as a result the eccentric action of the crank pin 23 will assist the centrifugal force of the half-ball valve 15 in opposing the spring 16. The half-ball valve will therefore move further away from its seat and spill a greater proportion of the fuel delivered by the pump 6, thus decreasing the power of the engine and counteracting the increase in the engine speed even before this increase has been sufficient to cause appreciable further opening of the valve 15 due to the increased centrifugal action. Conversely when the engine speed shows a tendency to decrease, the fly-wheel 22 will tend to advance relative to the shaft 1, thereby transmitting through the bracket 25 onto the half-ball valve a force assisting the tendency of spring 16 to close the valve. The opening of the valve 15 will thus be reduced, so as to decrease the spill and increase the fuel supply to the engine, thus again producing a correction of the undesired tendency.

The embodiment of FIGURES 2 to 4 is similar in action, except that in the centrifugal governor to which it is applied the half-ball valve 15, instead of being carried by a reed spring 16 extending longitudinally of the shaft, is carried by a pair of U-shaped blade springs 27 extending cross-wise of the shaft in the manner described in the specification of our U.S.A. Patent No. 3,088,476. Furthermore this construction is simplified by mounting the fly-wheel 28 rotatably on a coaxial pin 29 of the governor shaft 30 and providing its hub 31 with an eccentric external surface directly co-operating with a transverse slot or guide surfaces 32 of the member 33, which is the equivalent of the member 24 of FIGURE 1, and which has been formed integral with a cup portion 34 which performs the function of cup 26 of FIGURE 1.

Various details of the illustrated embodiments may be varied within the scope of the invention. Thus the eccentric may be replaced by a pair of opposed non-circular cam surfaces.

What we claim is:

1. A centrifugal governor comprising a rotatable governor shaft, a fly-wheel member mounted for rotation coaxially in relation to said governor shaft, a centrifugal mass comprising a valve element rotatable with said governor shaft and movable relatively to said shaft under its own centrifugal action, spring means coupled to said governor shaft and carrying said centrifugal mass and opposing said movement under centrifugal action, and cam means coupling said fly-wheel to said centrifugal mass so that relative angular displacement between said fly-wheel and said governor shaft produces displacement of said valve element in a direction dependent upon the sense of said relative angular displacement.

2. A centrifugal governor as claimed in claim 1, comprising a blade spring constituting said spring means, and a bracket coupled to said blade spring and to said cam means.

3. A centrifugal governor as claimed in claim 2 comprising an auxiliary shaft carrying said fly-wheel member and mounted for rotation in a co-axial bore in said governor shaft, and an eccentric, in said cam means, carried by said auxiliary shaft at a position axially displaced from said fly wheel member.

References Cited

UNITED STATES PATENTS

| | | | |
|---|---|---|---|
| 646,237 | 3/1900 | Rites | 73—512 |
| 1,091,181 | 3/1914 | Baldwin | 73—512 |
| 2,630,815 | 3/1953 | Worthing | 137—48 |
| 3,040,761 | 6/1962 | Moss | 137—56 |
| 3,045,686 | 7/1962 | Broad | 137—56 |
| 3,088,476 | 5/1963 | Kellner | 137—56 |

FOREIGN PATENTS

| | | |
|---|---|---|
| 503,667 | 12/1954 | Italy. |
| 318,579 | 2/1957 | Switzerland. |

CLARENCE R. GORDON, *Primary Examiner.*